United States Patent
Lei et al.

(10) Patent No.: US 9,894,699 B2
(45) Date of Patent: Feb. 13, 2018

(54) METHODS AND APPARATUSES FOR PROXIMITY-BASED SERVICE

(71) Applicant: Nokia Technologies Oy, Espoo (FI)

(72) Inventors: Yixue Lei, Beijing (CN); Vinh Van Phan, Oulu (FI); Ling Yu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 15/036,943

(22) PCT Filed: Dec. 30, 2013

(86) PCT No.: PCT/CN2013/090941
§ 371 (c)(1),
(2) Date: May 16, 2016

(87) PCT Pub. No.: WO2015/100550
PCT Pub. Date: Jul. 9, 2015

(65) Prior Publication Data
US 2016/0278152 A1 Sep. 22, 2016

(51) Int. Cl.
*H04W 76/02* (2009.01)
*H04W 4/00* (2009.01)
(Continued)

(52) U.S. Cl.
CPC ......... *H04W 76/023* (2013.01); *H04W 4/005* (2013.01); *H04W 4/008* (2013.01);
(Continued)

(58) Field of Classification Search
CPC ............. H04W 76/023; H04W 74/043; H04W 28/021; H04W 72/048
See application file for complete search history.

(56) References Cited

U.S. PATENT DOCUMENTS 5,995,500 A 11/1999 Ma et al.
6,415,146 B1 7/2002 Capece
(Continued)

FOREIGN PATENT DOCUMENTS

CN 102857901 1/2013
CN 103200634 7/2013
(Continued)

OTHER PUBLICATIONS

Machine Translation of WO 2014124610 A1 above.*
(Continued)

*Primary Examiner* — Robert M Morlan
(74) *Attorney, Agent, or Firm* — Nokia Technologies Oy

(57) ABSTRACT

Methods, corresponding apparatuses, and non-transitory computer readable mediums for a Proximity-based Service are provided. A method comprises receiving, from at least one user equipment, a resource utilization indication that indicates resources used by at least one user equipment for a ProSe device-to-device discovery procedure. The method also comprises determining, based on the received resource utilization indication, resources for the at least one user equipment to perform a subsequent ProSe device-to-device discovery procedure. The method additionally comprises signaling the determined resource to the at least one user equipment. With the claimed inventions, utilization efficiency of the radio resources may be improved and the complexity and overhead in allocating the resource for ProSe D2D discovery procedure may be lowered.

20 Claims, 3 Drawing Sheets

(51) Int. Cl.
    H04W 36/00    (2009.01)
    H04W 72/04    (2009.01)
(52) U.S. Cl.
    CPC ... *H04W 36/0016* (2013.01); *H04W 36/0055* (2013.01); *H04W 72/0426* (2013.01)

(56) References Cited

U.S. PATENT DOCUMENTS

| | | | |
|---|---|---|---|
| 8,213,360 | B2 | 7/2012 | Koskela et al. |
| 2006/0160544 | A1 | 7/2006 | Sun et al. |
| 2006/0178148 | A1 | 8/2006 | Du et al. |
| 2013/0059583 | A1 | 3/2013 | Vab Phan et al. |
| 2013/0172036 | A1 | 7/2013 | Miklos et al. |
| 2013/0303223 | A1* | 11/2013 | Patil ............... H04W 8/005 455/517 |
| 2013/0324114 | A1 | 12/2013 | Raghothaman et al. |
| 2014/0295832 | A1* | 10/2014 | Ryu ............... H04W 48/16 455/434 |
| 2016/0219541 | A1* | 7/2016 | Chatterjee ......... H04W 36/0055 |
| 2016/0278069 | A1* | 9/2016 | Lee ............... H04W 48/08 |

FOREIGN PATENT DOCUMENTS

| | | | |
|---|---|---|---|
| WO | 2006/119453 | A1 | 11/2006 |
| WO | 2011/063845 | A1 | 6/2011 |
| WO | 2013/014641 | A1 | 1/2013 |
| WO | 2013/048296 | A1 | 4/2013 |
| WO | 2013/120267 | A1 | 8/2013 |
| WO | 2013/121399 | A1 | 8/2013 |
| WO | 2013/163599 | A2 | 10/2013 |
| WO | WO 2014124610 | A1 * | 8/2014 ............ H04W 8/005 |

OTHER PUBLICATIONS

U.S. Appl. No. 12/604,733, "Systems, Methods, and Apparatuses for Facilitating Device-to-device Connection Establishment", filed Oct. 23, 2009, pp. 1-47.

Li et al., "Device-to-Device (D2D) Communication in MU-MIMO Cellular Networks", IEEE Global Communications conference, Dec. 3-7, 2012, pp. 3583-3587.

Partial Supplementary European Search Report received for corresponding European Patent Application No. 13900847.8, dated May 18, 2017, 11 pages.

Extended European Search Report received for corresponding European Patent Application No. 13900847.8, dated Jun. 14, 2017, 12 pages.

International Search Report and Written Opinion received for corresponding Patent Cooperation Treaty Application No. PCT/CN2013/090941, dated Jul. 4, 2014, 14 pages.

* cited by examiner

METHODS AND APPARATUSES FOR PROXIMITY-BASED SERVICE

RELATED APPLICATION

This application was originally filed as PCT Application No. PCT/CN2013/090941 filed Dec. 30, 2013.

FIELD OF THE INVENTION

Example embodiments of the present disclosure generally relate to wireless communication techniques including the 3rd Generation Partnership Project ("3GPP") Long Term Evolution (LTE) technique. More particularly, example embodiments of the present disclosure relate to methods, apparatuses, and non-transitory computer readable mediums for a Proximity-based Service ("ProSe").

BACKGROUND OF THE INVENTION

Various abbreviations that appear in the specification and/or in the drawing figures are defined as below:
BS Base Station
CN Core Network
Device-to-Device D2D
eNB evolved Node B
E-UTRA Evolved Universal Terrestrial Radio Access
GW Gateway
MME Mobility Management Entity
ProSe Proximity based Service
UE User Equipment The following description of background art may include insights, discoveries, understandings or disclosures, or associations together with disclosures not known to the relevant art prior to the present disclosure but provided by the present disclosure. Some such contributions of the present disclosure may be specifically pointed out below, while other such contributions of the present disclosure will be apparent from their context.

With the rapid developments of an LTE system, a high-speed data service via low power nodes (e.g., a small cell BS) becomes increasingly important to suit the requirements of wireless communication users. It is known that the small cell BS, which is generally deployed to be closer to UEs than a macro BS in some certain areas, such as at hotspots, is capable of providing a relatively high speed data service. Therefore, how to provide ProSe communication either via direct D2D communication, or locally routed by a BS (or an eNB) without CN involved to achieve a high speed data rate under a wireless communication system, e.g., the LTE system, has become a hot topic in the 3GPP.

SUMMARY OF THE INVENTION

The following presents a simplified summary of the present disclosure in order to provide a basic understanding of some aspects of the present disclosure. It should be noted that this summary is not an extensive overview of the present disclosure and that it is not intended to identify key/critical elements of the present disclosure or to delineate the scope of the present disclosure. Its sole purpose is to present some concepts of the present disclosure in a simplified form as a prelude to the more detailed description that is presented later.

According to an aspect of the present disclosure, there is provided a method. The method comprises receiving, from at least one user equipment, a resource utilization indication that indicates resources used by the at least one user equipment for a ProSe device-to-device discovery procedure. The method also comprises determining, based on the received resource utilization indication, resources for the at least one user equipment to perform a subsequent ProSe device-to-device discovery procedure. The method additionally comprises signaling the determined resource to the at least one user equipment.

In one embodiment, the determining comprises determining the resources at a single base station or comprises coordinating between at least two base stations to determine the resources, and wherein the determined resources are at least partially overlapped with resources indicated by the resource utilization indication.

In another embodiment, the at least one user equipment is in transition from an idle mode to a connected mode and the determining comprises determining the resources based on the resource utilization indication received in the idle mode.

In yet another embodiment, the at least one user equipment moves from one of the at least two base stations to another one of the at least two base stations, and the method further comprises coordinating to determine the resources if the received resource utilization indication is cell specific.

In a further embodiment, the subsequent ProSe device-to-device discovery procedure occurs during a handover between the at least two base stations and the method further comprises transferring context information about the subsequent ProSe device-to-device discovery procedure from a source one of the at least two base stations to a target one of the at least two base stations.

In one embodiment, the method further comprises updating a resource pool established for the ProSe device-to-device discovery procedures based on the determined resources.

In another embodiment, the determining comprises coordinating to establish respective resources pools for respective idle mode user equipments and connected mode user equipments for performing respective ProSe device-to-device discovery procedures.

According to another aspect of the present disclosure, there is provided a method. The method comprises sending, from at least one user equipment to at least one base station, a resource utilization indication that indicates resources used by the at least one user equipment for a ProSe device-to-device discovery procedure. The method also comprises receiving, from the at least one base station, a resource allocation indication that indicates resources determined for the user equipment to perform a subsequent ProSe device-to-device discovery procedure. The method additionally comprises performing the subsequent ProSe device-to-device discovery procedure using the determined resources, wherein the determined resources are based on the resources indicated by the resource utilization indication.

In one embodiment, the subsequent ProSe device-to-device discovery procedure occurs during a handover between at least two base stations and the method further comprises suspending the subsequent ProSe device-to-device discovery procedure during the handover and resuming the subsequent ProSe device-to-device discovery procedure after the handover is completed.

In another embodiment, the determined resources are at least partially overlapped with the resources indicated by the resource utilization indication.

According to an aspect of the present disclosure, there is provided an apparatus. The apparatus comprises at least one processor and at least one memory including computer program code. The memory and the computer program code are configured to, with the at least one processor, cause the apparatus at least to receive, from at least one user equipment, a resource utilization indication that indicates resources used by at least one user equipment for a ProSe device-to-device discovery procedure. The memory and the computer program code are also configured to, with the at least one processor, cause the apparatus at least to determine, based on the received resource utilization indication, resources for the at least one user equipment to perform a subsequent ProSe device-to-device discovery procedure. The memory and the computer program code are further configured to, with the at least one processor, cause the apparatus at least to signal the determined resource to the at least one user equipment.

According to another aspect of the present disclosure, there is provided an apparatus. The apparatus comprises at least one processor and at least one memory including computer program code. The memory and the computer program code are configured to, with the at least one processor, cause the apparatus at least to send, from at least one user equipment to at least one base station, a resource utilization indication that indicates resources used by the at least one user equipment for a ProSe device-to-device discovery procedure. The memory and the computer program code are also configured to, with the at least one processor, cause the apparatus at least to receive, from the at least one base station, a resource allocation indication that indicates resources determined for the at least one user equipment to perform a subsequent ProSe device-to-device discovery procedure. The memory and the computer program code are further configured to, with the at least one processor, cause the apparatus at least to perform the subsequent ProSe device-to-device discovery procedure using the determined resources, wherein the determined resources are based on the resources indicated by the resource utilization indication.

According to an aspect of the present disclosure, there is provided an apparatus. The apparatus comprises means for receiving, from at least one user equipment, a resource utilization indication that indicates resources used by the at least one user equipment for a ProSe device-to-device discovery procedure. The apparatus also comprises means for determining, based on the received resource utilization indication, resources for the at least one user equipment to perform a subsequent ProSe device-to-device discovery procedure. The apparatus further comprises means for signaling the determined resource to the at least one user equipment.

According to another aspect of the present disclosure, there is provided an apparatus. The apparatus comprises means for sending, from at least one user equipment to at least one base station, a resource utilization indication that indicates resources used by the at least one user equipment for a ProSe device-to-device discovery procedure. The apparatus also comprises means for receiving, from the at least one base station, a resource allocation indication that indicates resources determined for the at least one user equipment to perform a subsequent ProSe device-to-device discovery procedure. The apparatus further comprises means for performing the subsequent ProSe device-to-device discovery procedure using the determined resources, wherein the determined resources are based on the resources indicated by the resource utilization indication.

According to an aspect of the present disclosure, there is provided a non-transitory computer readable medium having program code stored thereon, the program code configured to direct an apparatus, when executed, to receive, from at least one user equipment, a resource utilization indication that indicates resources used by at least one user equipment for a ProSe device-to-device discovery procedure. The program code is also configured to direct the apparatus, when executed, to determine, based on the received resource utilization indication, resources for the at least one user equipment to perform a subsequent ProSe device-to-device discovery procedure. The program code is further configured to direct the apparatus, when executed, to signal the determined resource to the at least one user equipment.

According to another aspect of the present disclosure, there is provided a non-transitory computer readable medium having program code stored thereon, the program code configured to direct an apparatus, when executed, to send, from at least one user equipment to at least one base station, a resource utilization indication that indicates resources used by the at least one user equipment for a ProSe device-to-device discovery procedure. The program code is also configured to direct the apparatus, when executed, to receive, from the at least one base station, a resource allocation indication that indicates resources determined for the at least user equipment to perform a subsequent ProSe device-to-device discovery procedure. The program code is further configured to direct the apparatus, when executed, to perform the subsequent ProSe device-to-device discovery procedure using the determined resources, wherein the determined resources are based on the resources indicated by the resource utilization indication.

The aspects and embodiments of the present disclosure as described above may be utilized separately or in combination and different combining forms may be constituted to target the intention of the present disclosure as mentioned in the following.

By virtue of the aspects and embodiments of the present disclosure, the times that the network would have to reallocate the resources to the D2D UE for performing the ProSe discovery procedure could be significantly decreased, especially when the D2D UE moves from one cell to another cell, for example in an intra-BS or inter-BS mobility scenario. In this manner, utilization efficiency of the radio resources may be improved and the complexity and signaling overhead in allocating the resource for ProSe discovery procedure may be lowered.

BRIEF DESCRIPTION OF THE DRAWINGS

The embodiments of the present disclosure that are presented in the sense of examples and their advantages are explained in greater detail below with reference to the accompanying drawings, in which.

DETAILED DESCRIPTION OF EMBODIMENTS

Figure 1:
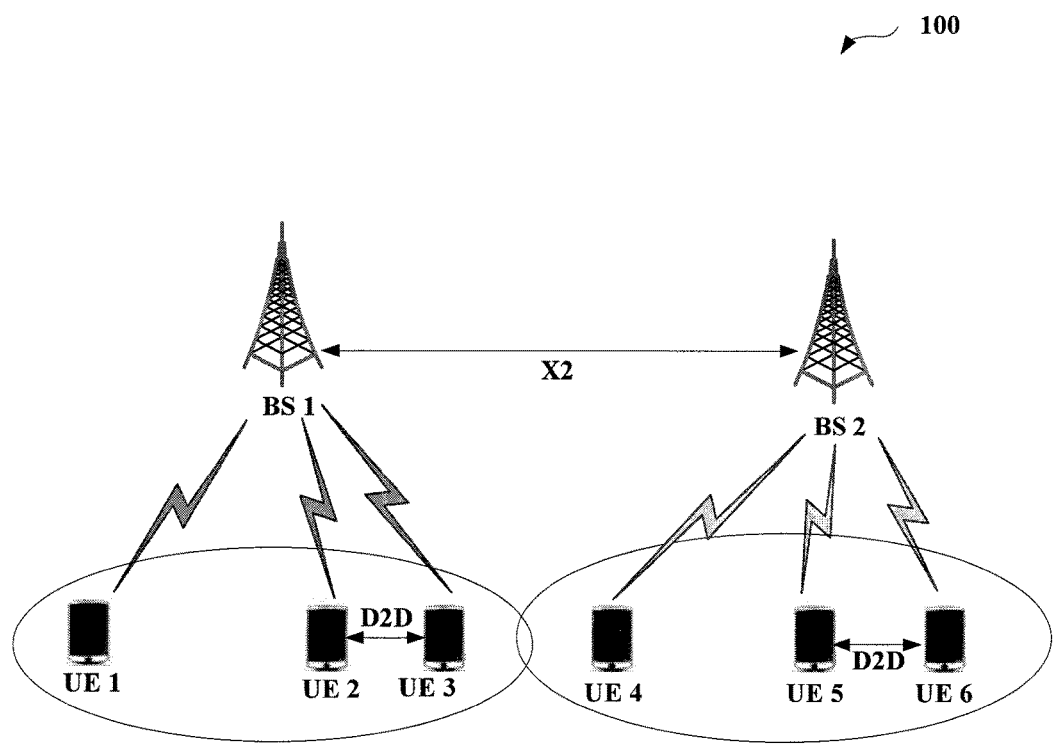
FIG. 1 illustrates an exemplary connectivity architecture in which embodiments of the present disclosure can be practiced.

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, a UE may be any suitable wireless communication terminal, such as a mobile phone or a portable computer. Below, reference is often made to a D2D enabled UE, that is, a UE that supports the D2D communication. However, this should not limit the present disclosure to any specific communication standard. Rather, the terms UE and communication terminal may be regarded as essentially synonymous, unless conflicting with the context. Likewise, the BS may be any suitable radio BS, according to any suitable communication standard, such as a Node B or an eNode B.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

The exemplary embodiments of the present disclosure generally relate to ProSe D2D discovery in E-UTRA which has been studied in 3GPP for Rel-12 and beyond. In particular, the exemplary embodiments of the present disclosure relate to ProSe discovery control with reduced signaling overhead such that the chances for reallocation of the radio resources to the UEs for ProSe discovery procedures could be minimized.

In 3GPP RAN2, type1 and type2 resource allocation methods have been identified. In type1 allocation, D2D UEs obtain discovery resources from a common resource pool delivered in a system information block broadcasted from the network. Thus, the type1 allocation is applicable to UEs in an idle mode or a connected mode. In contrast, for the type2 allocation, D2D UEs obtain discovery resources in a UE-specific manner either for each discovery signal transmission or for series of discovery signal transmission. Currently, in 3GPP, no conclusion has been reached on which resource allocation type should be supported in Rel-12.

Given such a standardization background as above, a crucial problem of how to control the ProSe discovery context and coordinate the ProSe discovery resources, especially when UE mobility is taken into account, should be addressed. For instance, within a certain area are many UEs in close proximity to each other and these UEs are likely to migrate among different cells covered by different types of BSs while the ProSe are being served, it is beneficial to manage the ProSe discovery resources and context properly to reduce the chances for discovery resource reallocation and related signaling cost when the UEs are moving from one cell to another cell and the ProSe is about to be established in the other cell. For a better understanding of the present disclosure, the following will describe an exemplary architecture in which the embodiments of the present disclosure may be practiced.

FIG. 1 illustrates an exemplary connectivity architecture 100 in which embodiments of the present disclosure can be practiced. As illustrated in FIG. 1, the architecture 100 comprises BSs 1 and 2, which may be in connection with each other via an X2 interface which is known to those skilled in the art. As shown, the BS 1 may communicate with each of UEs 1-3 in a cellular manner and the UEs 2 and 3 are in ProSe D2D communication since they are sufficiently close to each other. The similar occurs at the BS 2 and UEs 4-6. It should be noted that the number of the UEs as illustrated herein are only for exemplary purposes and there could be many UEs within the coverage area of the BS depending upon the coverage capability of the BS. Further, depending on different implementations, there may be additional entities in the architecture 100 which are not illustrated for simplification purposes. For example, an MME/S-GW entity may connect with the BSs (i.e., eNBs) so as to connect the UE to the CN and forward the data between the BS and CN.

In an inter-BS scenario in which the UE 3, either in an idle mode or a connected mode, moves, from a cell provided by the BS 1 and depicted by an ellipse, into a new cell provided by the BS 2 and also depicted by an ellipse, it may initiate a ProSe discovery procedure in the new cell with another UE within the new cell, for example, UE 4, which is depicted as close to the UE 3. Although not expressly illustrated in FIG. 1, in an intra-BS scenario, the UE 3 may move from one cell to another cell, both of which are served by the BS 1, and the UE 3 may initiate the ProSe discovery procedure in the other cell. Regarding the resources used for the ProSe discovery procedure in the new cell, the prior art does not give any teaching about how to allocate or reallocate such resources when UE's intra-BS or inter-BS mobility is taken into account. To this end, the embodiments of the present disclosure propose several methods which will be discussed in detail with references to FIGS. 2 and 3 and which may be applicable to the intra-BS or inter-BS mobility scenario as appropriate.

Figure 2:
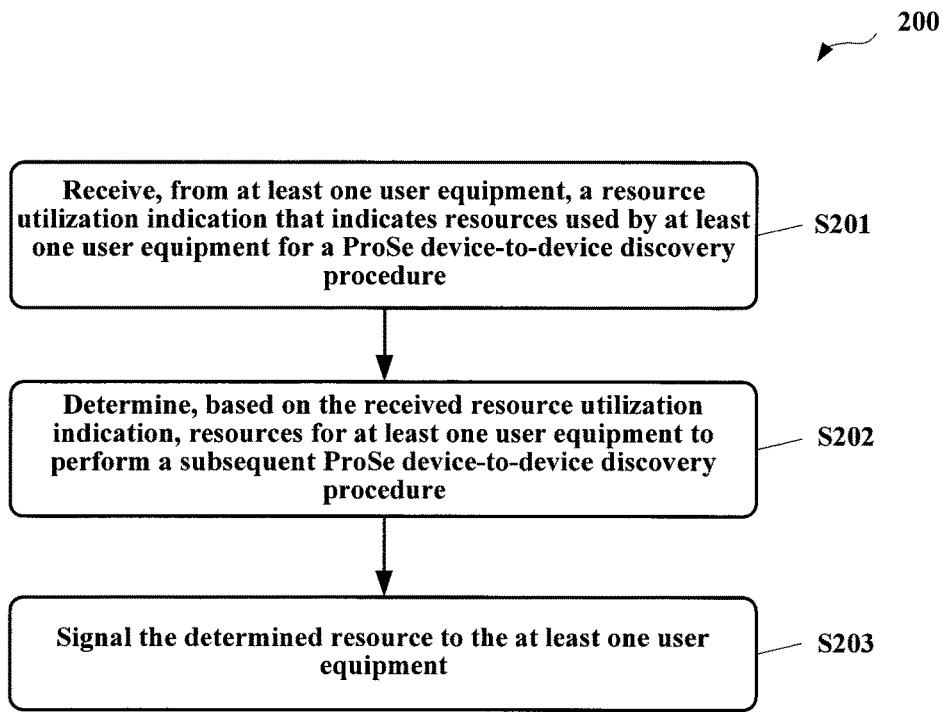
FIG. 2 is a flow chart schematically illustrating a method for a ProSe, from a BS perspective, according to an embodiment of the present disclosure.

FIG. 2 is a flow chart schematically illustrating a method 200 for a ProSe, from a BS perspective, according to an embodiment of the present disclosure. As illustrated in FIG. 2, at step S201, the method 200 receives, from at least one UE (for example, UE 3 as illustrated in FIG. 1), a resource utilization indication that indicates resources used by at least one UE for a ProSe D2D discovery procedure. The resource utilization indication herein could be included in an uplink signaling message from the UE to the BS and indicative of the D2D discovery resources as previously or currently used by the at least one UE, for example, the resources as used by the UE 3 within the coverage area of the BS 1.

At step S202, the method 200 determines, based on the received resource utilization indication, resources for the at least one UE to perform a subsequent ProSe D2D discovery procedure. Although not illustrated, in an embodiment, the determining at step S202 may comprise determining the resources at a single BS or comprise coordinating between at least two BSs to determine the resources, and the determined resources are at least partially overlapped with resources indicated by the resource utilization indication.

As mentioned before, the solutions as proposed by the present disclosure may be applicable to the intra-BS scenario and thus the resources may be determined at a single BS, for example, BS 1, which is currently serving the UE 3 and determining the resources for the UE 3 when it moves from one cell to another cell within the coverage area of the BS 1. Similarly, for the inter-BS scenario, the determining may comprise coordinating between two BSs (for example, BS 1 and BS 2) to determine the proper resources. The coordination herein may be triggered upon a number of actions or events and implemented by various manners, for example, through a dedicated signaling channel via the X2 interface. Since the determined resources are at least partially overlapped with resources indicated by the resource utilization indication, the possibility or the number of times for performing resource reallocation for the ProSe discovery procedure could be notably reduced. The determined or coordinated resources may be time and frequency resources respectively in time and frequency domains.

In an embodiment in which the at least one UE is in an idle mode or moves from one of the at least two BSs to another one of the at least two BSs, and the method 200 may determine to coordinate the resources if the received resource utilization indication is cell specific. In other words, for the idle mode UEs, if there are on-going D2D discovery operations and its beaconing resources (i.e., resources for ProSe discover operations) are per-cell or cell specific, coordination among BSs may be needed to reduce the possibility for resource reallocation. That is, to support the proposed mechanism, for the idle mode UEs, the resource pool among multiple cells should be common or overlapped, or there are common resources in those pools for different cells. If an idle mode UE selects a beaconing channel initially based on its UE identity with a possible collision resolution, then it would be quite sensible for neighboring cells to have the same or nearly same resource pool.

In another embodiment in which the at least one UE is in transition from an idle mode to a connected mode and the method 200 may determine the resources based on the resource utilization indication received in the idle mode. For example, if the UE transits to the connected mode, beaconing resources should be maintained as many as possible in the BS in which the UE had camped on. By indicating to the BS about its beaconing resource used in the idle state so far, the UE may be signaled by the BS to keep the beaconing resource unchanged. After the mode or state transition, if the UE is handed over to the target cell, it may hold the existing beaconing channel until a possible collision is detected and resolved, which might affect either the UEs subject to the handover or other UEs existing in the cell. In a worst situation, the BS, in which the UE may camp on or to which the UE may be handed over, may reallocate new beaconing resources for the UE since resources which are at least partially overlapped with the previously-used beaconing resources are not available. Further, if the BS has constituted a resource pool for the ProSe D2D discovery procedures, it may update the pools for IDLE/CONNECTED beaconing, e.g., based on the determining at step S202.

Regarding the resource pool, the BSs, upon coordination, may establish respective resources pools for respective idle mode UEs and connected mode UEs for performing respective ProSe D2D discovery procedures. Such an arrangement is due to the potential situation that the resource pool range for beaconing channels is large but the beaconing resources available within the neighboring cells are not sufficient relative to the beaconing resource range. Therefore, it would be advantageous to exclusively share the resource pools among the neighboring cells, at least for active UEs. In this way, each of a plurality of BSs may be assigned with two types of exclusive resource pools (one for idle UEs and the other for active UEs) by a central entity or by coordinating among the plurality of BSs.

In yet another embodiment, the method 200 may transfer context information (or parameters) about the ProSe D2D discovery procedure of at least one UE from one of the at least two BSs (i.e., a source BS) to another one of the at least two BSs (i.e., a target BS) when the at least one UE is handed over from the one BS to the other BS. By transferring discovery related context information between the source and target eNBs, the signaling cost for reallocation of beaconing resources may be saved.

Returning to the flow, at step S203, the method 200 signals the determined resource to the at least one UE for performing the ProSe D2D discovery procedure.

With the method 200 and its variants as discussed above in the various embodiments, which may be carried out by the BS, the determined resources at a single BS or determined resources through the coordination between the at least two BS are at least partially overlapped with resources indicated by the resource utilization indication such that the resources allocated for the D2D discovery are not significantly distinct from those previously or currently used and thereby brand-new reallocation of the resources for the UE to perform the D2D discovery may be unnecessary or avoidable. Thereby, the utilization efficiency of the radio resources could be enhanced and over-the-air signaling cost with respect to the resource reallocation may be reduced.

Figure 3:
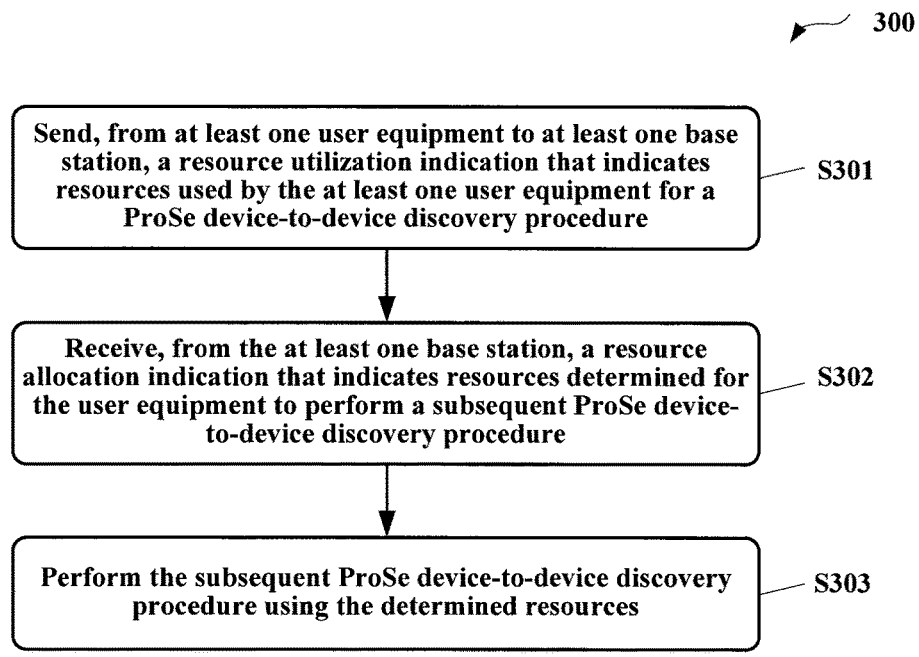
FIG. 3 is a flow chart schematically illustrating a method for a ProSe, from a UE perspective, according to another embodiment of the present disclosure.

FIG. 3 is a flow chart schematically illustrating a method 300 for ProSe, from a UE perspective, according to an embodiment of the present disclosure. As illustrated in FIG. 3, the method 300 sends, from at least one UE (for example, UE 3 shown in FIG. 1) to at least one BS (for example, BS 1 or BS 2 or both), a resource utilization indication that indicates resources used by the at least one UE for a ProSe D2D discovery procedure. The resource utilization indication herein may be identical to one that has been discussed in the method 200 and thus further details thereof are omitted for clarity purposes. Then, at step S302, the method 300 receives from the at least one BS, a resource allocation indication that indicates resources determined for the at least one UE to perform a subsequent ProSe D2D discovery procedure. The resource allocation indication may be signaled by the BS such as discussed at step S203 in the method 200. The determined resources herein may have the same technical meaning and characteristic as those discussed in the method 200, and further descriptions are thus omitted herein to simplify the context.

Upon receipt of the resource allocation indication, the method 300 proceeds to step S303, at which the method 300 performs the subsequent ProSe D2D discovery procedures using the determined resources.

Although not illustrated, in an embodiment, the method 300 may further comprise sending, from the UE, a resource utilization indication of the ProSe D2D discovery procedure to one of the at least two BS which has no knowledge about resource utilization of the UE for the ProSe D2D discovery procedure, for example, a BS in which the UE may camp on or to which the UE may be handed over. In another embodiment, the subsequent ProSe D2D discovery procedure occurs during a handover between at least two BSs and the method 300 may further comprise suspending the subsequent ProSe D2D discovery procedure during the handover and resuming the subsequent ProSe D2D discovery procedure after the handover is completed. In this manner, the utilization of unstable radio resources could be bypassed and the potential interference during the handover procedure could be avoided.

In an embodiment, the determined resources are at least partially overlapped with the resources indicated by the resource utilization indication. In this manner, the likelihood of assigning completely different resources for ProSe D2D discovery procedure could be lowered and signaling cost could be further saved, thereby giving resource utilization a boost.

Figure 4:
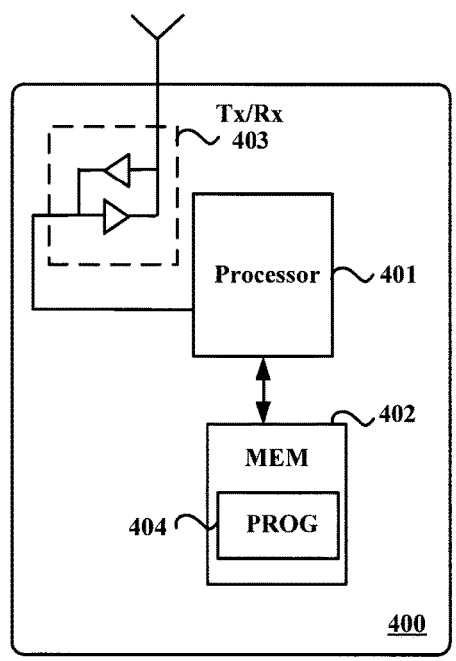
FIG. 4 is a simplified schematic block diagram illustrating a representative apparatus according to an embodiment of the present disclosure.

FIG. 4 is a simplified schematic block diagram illustrating a representative apparatus 400 according to an embodiment of the present disclosure. As illustrated in FIG. 4, the apparatus 400 includes at least one processor 401, such as a data processor, at least one memory (MEM) 402 coupled to the processor 401, and a suitable RF transmitter TX and receiver RX 403 coupled to the processor 401. The MEM 402 stores a program (PROG) 404. The TX/RX 403 is for bidirectional wireless communications. Note that the TX/RX 403 has at least one antenna to facilitate communication, though in practice an apparatus will typically have several for e.g., the MIMO communication.

The PROG 404 is assumed to include instructions that, when executed by the processor 401, enable the apparatus 400 to operate in accordance with the exemplary embodiments of the present disclosure, as discussed herein with the methods 200 and 300. For example, the apparatus 400 may be embodied as a BS or a part thereof to carry out the method 200 or the apparatus 400 may also be embodied as a UE or a part thereof to carry out the method 300, according to embodiments of the present disclosure.

In general, the embodiments of the present disclosure may be implemented by computer software executable by at least one processor 401 of the apparatus 400, or by hardware, or by a combination of software and hardware.

The MEM 402 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 400, there may be several physically distinct memory units in the apparatus 400. The processor 401 may be of any type suitable to the local technical environment, and may include one or more of general purpose computers, special purpose computers, microprocessors, digital signal processors (DSPs) and processors based on multicore processor architecture, as non limiting examples. The apparatus 400 may have multiple processors, such as for example an application specific integrated circuit chip that is slaved in time to a clock which synchronizes the main processor.

Figure 5:
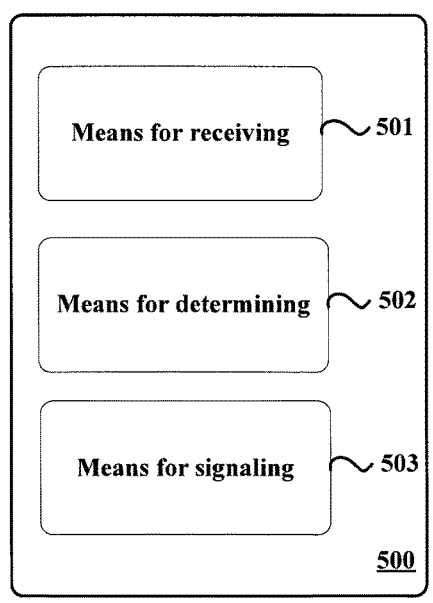
FIGS. 5 and 6 are simplified schematic block diagrams respectively illustrating an apparatus according to an embodiment of the present disclosure.
Figure 6:
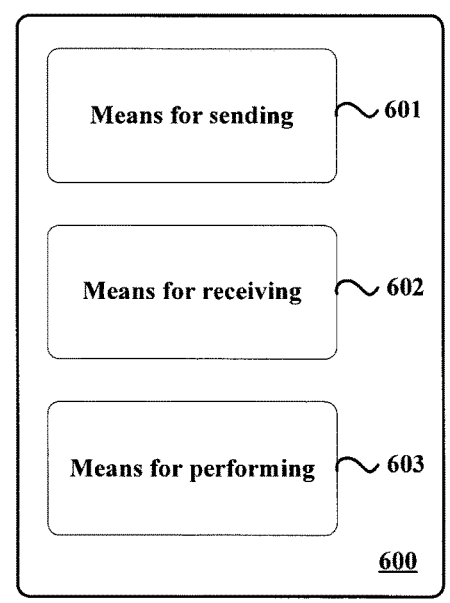

FIGS. 5 and 6 are simplified schematic block diagrams respectively illustrating an apparatus according to an embodiment of the present disclosure. Illustrated in FIG. 5 is an apparatus 500, which includes means 501 for receiving, from at least one UE, a resource utilization indication that indicates resources used by the at least one UE for a ProSe D2D discovery procedure, means 502 for determining, based on the received resource utilization indication, resources for the at least one UE to perform a subsequent ProSe D2D discovery procedure, and means 503 for signaling the determined resource to the at least one UE.

Although not shown, in an embodiment, the means 502 may comprise means for determining the resources at a single BS or comprises means for coordinating between at least two BSs to determine the resources, and wherein the determined resources are at least partially overlapped with resources indicated by the resource utilization indication.

In another embodiment, the at least one UE moves from one of the at least two BSs to another one of the at least two BSs, and the apparatus 500 may further comprise means for coordinating to determine the resources if the received resource utilization indication is cell specific, that is, each of different cells may have been assigned respective different resources for the ProSe D2D discovery procedure thus far. In yet another embodiment, the at least one UE is in transition from an idle mode to a connected mode and the means for determining may comprise means for determining the resources based on the resource utilization indication received in the idle mode.

In a further embodiment, the subsequent ProSe D2D discovery procedure occurs during a handover between the at least two BSs and the apparatus 500 may further comprise means for transferring context information (or parameters) about the ProSe D2D discovery procedure of the at least one UE from a source one of the at least two BSs to a target one of the at least two BSs. In an additional embodiment, the apparatus 500 may further comprise means for updating a resource pool established for the ProSe D2D discovery procedures based on the determined resources.

In a further embodiment, the means 502 for determining may comprise means for coordinating to establish respective resources pools for respective idle mode UEs and connected mode UEs for performing respective ProSe D2D discovery procedures.

It is to be understood that the apparatus 500 is able to carry out the method 200 according to the embodiments of the present disclosure and may be embodied as a BS or a part thereof.

Illustrated in FIG. 6 is an apparatus 600, which includes means 601 for sending, from at least one UE to at least one BS, a resource utilization indication that indicates resources used by the at least one UE for a ProSe D2D discovery procedure, means 602 for receiving, from the at least one BS, a resource allocation indication that indicates resources determined for the at least one UE to perform a subsequent ProSe D2D discovery procedure, and means 603 for performing the subsequent ProSe D2D discovery procedure using the determined resources, wherein the determined resources are based on the resources indicated by the resource utilization indication.

Although not shown, in an embodiment, the subsequent ProSe D2D discovery procedure occurs during a handover between at least two BSs and the apparatus 600 may further comprise means for suspending the subsequent ProSe D2D discovery procedure during the handover and means for resuming the subsequent ProSe D2D discovery procedure after the handover is completed. In an embodiment, the determined resources are partially overlapped with the resources indicated by the resource utilization indication.

It is to be understood that the apparatus 600 is able to carry out the method 300 according to the embodiments of the present disclosure and may be embodied as a UE or a part thereof.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
    receiving, from at least one user equipment, a resource utilization indication that indicates resources used by at least one user equipment for a ProSe device-to-device discovery procedure;
    determining, based on the received resource utilization indication, resources for the at least one user equipment to perform a subsequent ProSe device-to-device discovery procedure; and
    signaling the determined resources to the at least one user equipment.

2. The method as recited in claim 1, wherein the determining comprises determining the resources for the at least one user equipment at a single base station or comprises coordinating between at least two base stations to determine the resources for the at least one user equipment, and
    wherein the determined resources are at least partially overlapped with resources indicated by the resource utilization indication.

3. The method as recited in claim 2, wherein the at least one user equipment is in transition from an idle mode to a connected mode and the determining comprises determining the resources for the at least one user equipment based on the resource utilization indication received in the idle mode.

4. The method as recited in claim 2, wherein the determining comprises coordinating between at least two base stations to determine the resources for the at least one user equipment; and wherein the at least one user equipment moves from one of the at least two base stations to another one of the at least two base stations, and the method further comprises:
    coordinating to determine the resources if the received resource utilization indication is cell specific.

5. The method as recited in claim 2 wherein the determining comprises coordinating between at least two base stations to determine the resources for the at least one user equipment; and wherein the subsequent ProSe device-to-device discovery procedure occurs during a handover between the at least two base stations and the method further comprises:
    transferring context information about the subsequent ProSe device-to-device discovery procedure from a source one of the at least two base stations to a target one of the at least two base stations.

6. The method as recited in claim 1, further comprising:
    updating a resource pool established for the ProSe device-to-device discovery procedure based on the determined resources.

7. The method as recited in claim 1, wherein the determining comprises coordinating to establish respective resources pools for respective idle mode user equipments and connected mode user equipments for performing respective ProSe device-to-device discovery procedures.

8. A method, comprising:
    sending, from at least one user equipment to at least one base station, a resource utilization indication that indicates resources used by the at least one user equipment for a ProSe device-to-device discovery procedure;
    receiving, from the at least one base station, a resource allocation indication that indicates resources determined for the at least one user equipment to perform a subsequent ProSe device-to-device discovery procedure; and
    performing the subsequent ProSe device-to-device discovery procedure using the determined resources,
    wherein the determined resources are based on the resources indicated by the resource utilization indication.

9. The method as recited in claim 8, wherein the subsequent ProSe device-to-device discovery procedure occurs during a handover between at least two base stations and the method further comprises:
    suspending the subsequent ProSe device-to-device discovery procedure during the handover; and
    resuming the subsequent ProSe device-to-device discovery procedure after the handover is completed.

10. The method as recited in claim 8, wherein the determined resources are at least partially overlapped with the resources indicated by the resource utilization indication.

11. An apparatus, comprising:
    at least one processor; and
    at least one memory including compute program instructions,
    wherein the at least one memory and computer program instructions are configured to, with the at least one processor, cause the apparatus at least to:
    receive, from at least one user equipment, a resource utilization indication that indicates resources used by the at least one user equipment for a ProSe device-to-device discovery procedure;
    determine, based on the received resource utilization indication, resources for the at least one user equipment to perform a subsequent ProSe device-to-device discovery procedure; and
    signal the determined resources to the at least one user equipment.

12. The apparatus as recited in claim 11, wherein the at least one memory and computer program instructions are configured to, with the at least one processor, cause the apparatus to:
    determine the resources for the at least one user equipment at a single base station or coordinate between at least two base stations to determine the resources for the at least one user equipment, and
    wherein the determined resources are at least partially overlapped with resources indicated by the resource utilization indication.

13. The apparatus as recited in claim 12, wherein the at least one user equipment is in transition from an idle mode to a connected mode, and wherein the at least one memory and computer program instructions are configured to, with the at least one processor, cause the apparatus to:
    determine the resources for the at least one user equipment based on the resource utilization indication received in the idle mode.

14. The apparatus as recited in claim 12, wherein, when the apparatus is caused to coordinate between at least two base stations to determine the resources for the at least one user equipment, the at least one user equipment moves from one of the at least two base stations to another one of the at least two base stations, and wherein the at least one memory and computer program instructions are configured to, with the at least one processor, cause the apparatus to coordinate to determine the resources if the received resource utilization indication is cell specific.

15. The apparatus as recited in claim 12, wherein, when the apparatus is caused to coordinate between at least two base stations to determine the resources for the at least one user equipment, the subsequent ProSe device-to-device discovery procedure occurs during a handover between the at least two base stations and wherein the at least one memory and computer program instructions are configured to, with the at least one processor, cause the apparatus to:
transfer context information about the subsequent ProSe device-to-device discovery procedure from a source one of the at least two base stations to a target one of the at least two base stations.

16. The apparatus as recited in claim 11, wherein the at least one memory and computer program instructions are configured to, with the at least one processor, cause the apparatus to:
update a resource pool established for the ProSe device-to-device discovery procedure based on the determined resources.

17. The apparatus as recited in claim 11, wherein the at least one memory and computer program instructions are configured to, with the at least one processor, cause the apparatus to coordinate to establish respective resources pools for respective idle mode user equipments and connected mode user equipments for performing respective ProSe device-to-device discovery procedures.

18. An apparatus, comprising:
at least one processor; and
at least one memory including compute program instructions,
wherein the at least one memory and computer program instructions are configured to, with the at least one processor, cause the apparatus at least to:
send, from at least one user equipment to at least one base station, a resource utilization indication that indicates resources used by the at least one user equipment for a ProSe device-to-device discovery procedure;
receive, from the at least one base station, a resource allocation indication that indicates resources determined for the at least one user equipment to perform a subsequent ProSe device-to-device discovery procedure; and
perform the subsequent ProSe device-to-device discovery procedure using the determined resources,
wherein the determined resources are based on the resources indicated by the resource utilization indication.

19. The apparatus as recited in claim 18, wherein the subsequent ProSe device-to-device discovery procedure occurs during a handover between at least two base stations and the at least one memory and computer program instructions are configured to, with the at least one processor, cause the apparatus to:
suspend the subsequent ProSe device-to-device discovery procedure during the handover; and
resume the subsequent ProSe device-to-device discovery procedure after the handover is completed.

20. The apparatus as recited in claim 18, wherein the determined resources are at least partially overlapped with the resources indicated by the resource utilization indication.

* * * * *